US005343617A

United States Patent [19]

Tanaka et al.

[11] Patent Number: 5,343,617
[45] Date of Patent: Sep. 6, 1994

[54] EQUIPMENT FOR CONNECTING WIRES TO ELECTRICAL CONNECTORS

[75] Inventors: Hiromi Tanaka, Machida; Hiroshi Yagawa, Sugimani, both of Japan

[73] Assignee: The Whitaker Corporation, Wilmington, Del.

[21] Appl. No.: 35,100

[22] Filed: Mar. 19, 1993

[30] Foreign Application Priority Data

Apr. 7, 1992 [JP] Japan .................................. 4-085596

[51] Int. Cl.$^5$ .............................................. B23P 21/00
[52] U.S. Cl. ........................................ 29/705; 29/749; 29/857; 29/861
[58] Field of Search ....................... 29/857, 861, 566.3, 29/749, 705, 33 M

[56] References Cited

U.S. PATENT DOCUMENTS

| | | | |
|---|---|---|---|
| 4,441,251 | 4/1984 | Grubb | 29/861 |
| 4,492,023 | 1/1985 | Schneider et al. | 29/861 |
| 4,493,147 | 1/1985 | Bakermans | 29/861 |
| 5,155,907 | 10/1992 | Dornes et al. | 29/857 |
| 5,199,161 | 4/1993 | Stachura | 29/749 X |

*Primary Examiner*—Carl J. Arbes
*Attorney, Agent, or Firm*—Timothy J. Aberle

[57] ABSTRACT

Simultaneous attaching of wires (13) through the pressure-connecting method to a number of electrical connectors (11) arranged in a row, makes it possible to process a larger number of electrical connectors at one time. A position-determining device (55) is provided for each electrical connector (11) which makes it possible to determine the position of each pressure-type contact of said electrical connectors (11) arranged in a row. The positioning determining device (55) is used to align a plurality of the electrical connectors (11) so that tolerance differences are not cumulative. FIG. 12.

14 Claims, 9 Drawing Sheets

Fig. 6
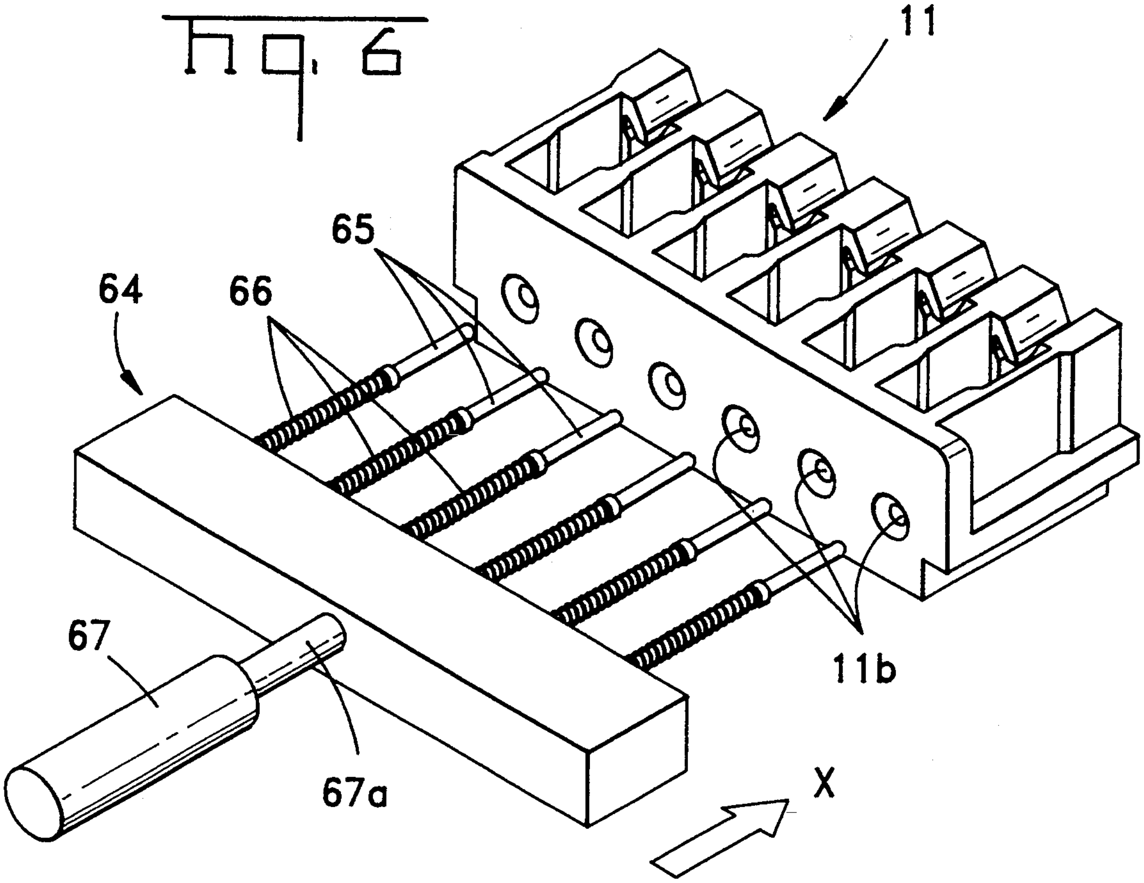
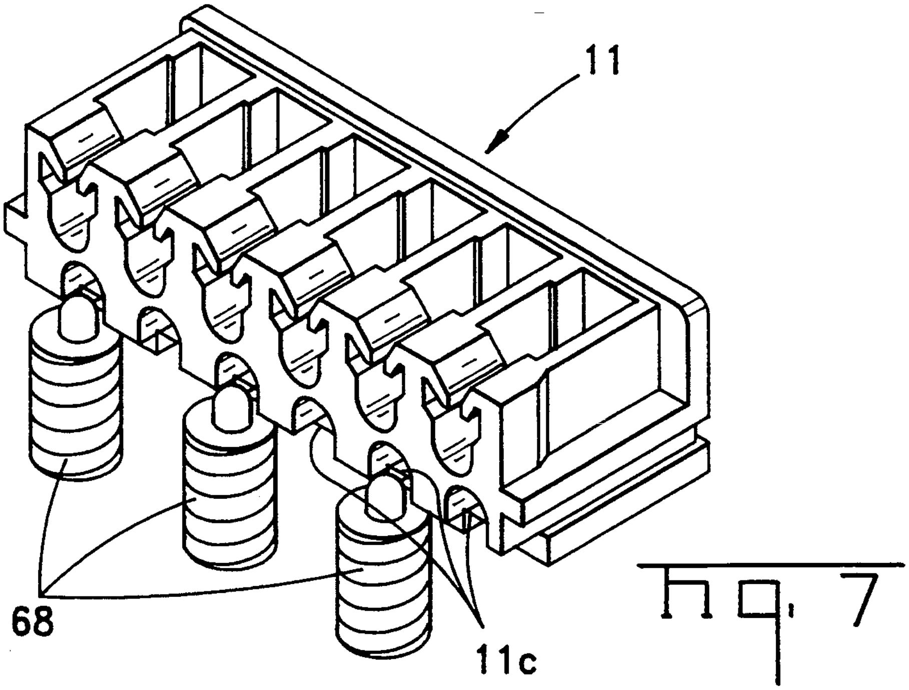
Fig. 7

EQUIPMENT FOR CONNECTING WIRES TO ELECTRICAL CONNECTORS

This invention relates to the machinery used for connecting electrical terminals by pressing of the wires into electrical connectors having multiple pressure-type contacts. Specifically, this invention concerns equipment in which several pressure-type electrical connectors are placed in a row in an impression section of a machine and electrical wires are then simultaneously connected by impression into pressure-type contacts.

BACKGROUND OF THE INVENTION

The machinery for connecting wires to electrical connectors is customarily used for the automatic production of harnesses in which electrical connectors having multiple contacts are sequentially supplied to the pressing section of the equipment, wherein multiple electrical wires are fed and pressed into the respective pressure-type contacts of the connectors.

In this description, the term "pressure" means the method according to which insulated electrical wires are pressed into slots made in contacts which results in insulation being cut and the core of the wire making an electrical connection with the contact, and wherein the "pressure-type" contacts are designed in such a way that it has a portion in which an insulated electrical wire is inserted by pressure, thus cutting through the insulation, and resulting in an electrical connection between the wire core and the contact.

In some of the equipment for making harnesses, for purposes of increased productivity, a number of electrical connectors are arranged in a row and simultaneously supplied to the pressure insertion section of the equipment, and the wires intended for connection to these connectors are also arranged in a row and supplied to the pressure insertion section, after which, a number of contacts become connected to their respective wires in one operation, thus making it possible to produce a number of harnesses in one operation. The simultaneous manufacture of a number of harnesses in one operation results in a substantial increase in productivity in the area of electrical harness making.

The conventional method of electrical harness production using special equipment and arranging them in a row calls for the accurate positioning of the connectors by selecting a point of reference, for example, a side surface of the side-most connector, then the side surface of the connector next to it, and so on.

The deciding factor in implementing the task of positioning the electrical wires supplied to the device making pressure connections and the "stuffer", which actually makes such connections, is the pressure-type contacts contained in the electrical connectors.

However, if the positioning is carried out by the conventional method described above, that is, by using the side surfaces of a number of electrical connectors arranged in a row, then the error over the total length of the connectors will have a cumulative effect. As a result, if the tolerance of the electrical wire pitch is ±0.3 mm and the tolerance of the connector housing length is ±0.1 mm, then the number of connectors simultaneously used in harness-making should not exceed three. Therefore, the number of electrical connectors which can be arranged in a row is limited by the consideration that the cumulative error in the external dimensions of the connector housings would not affect the quality of the pressure connection. In order to increase the number of such connectors, it is necessary to manufacture electrical connectors with a higher precision of external dimensions, but this would be a very difficult task. Additionally, this consideration was a major obstacle hampering the increase in productivity of the harnesses.

SUMMARY OF THE INVENTION

The equipment for connecting wires to electrical connectors according to this invention is characterized by the fact that in the equipment for simultaneous connection of wires to each pressure-type contact in a number of electrical connectors arranged in one row in the equipment for connecting wires to electrical connectors, a device is provided to determine the position of the pressure-type contacts in all of the individual electrical connectors arranged in the equipment for connecting wires to electrical connectors.

As for the above mentioned device for determining the position, it may be of any design providing for position determination and it may come in contact with any section of the electrical connector, for example: a side surface of the electrical connector housing; a protrusion or a depression made in the housing of each electrical connector; openings made for the contacts of the matching halves of the electrical connectors; or tie-ins of the contacts protruding from the connector housings.

Since, as has been mentioned above, using the device for determining the position, it is possible to determine the position of all electrical connectors arranged in a row in the equipment for connecting wires to electrical connectors according to this invention, the errors in the external dimensions of the electrical connectors arranged in a row is not cumulative. Therefore, the tolerances of the external dimensions of the electrical connectors may be, to a considerable degree, relaxed, so long as the precision of the pressure-type contacts position in each electrical connector is held to the necessary level. In addition, due to the fact that the error is not of a cumulative nature, it is possible to increase the number of electrical connectors in a row compared to the ordinary method, thus advantageously increasing the number of harnesses manufactured simultaneously.

BRIEF DESCRIPTION OF THE DRAWINGS

FIG. 6 is an oblique view of the specific detail of the fourth embodiment of this invention.

FIG. 7 is an oblique view of the specific detail of the fifth embodiment of this invention.

DESCRIPTION OF THE PREFERRED EMBODIMENT(S)

Figure 1:
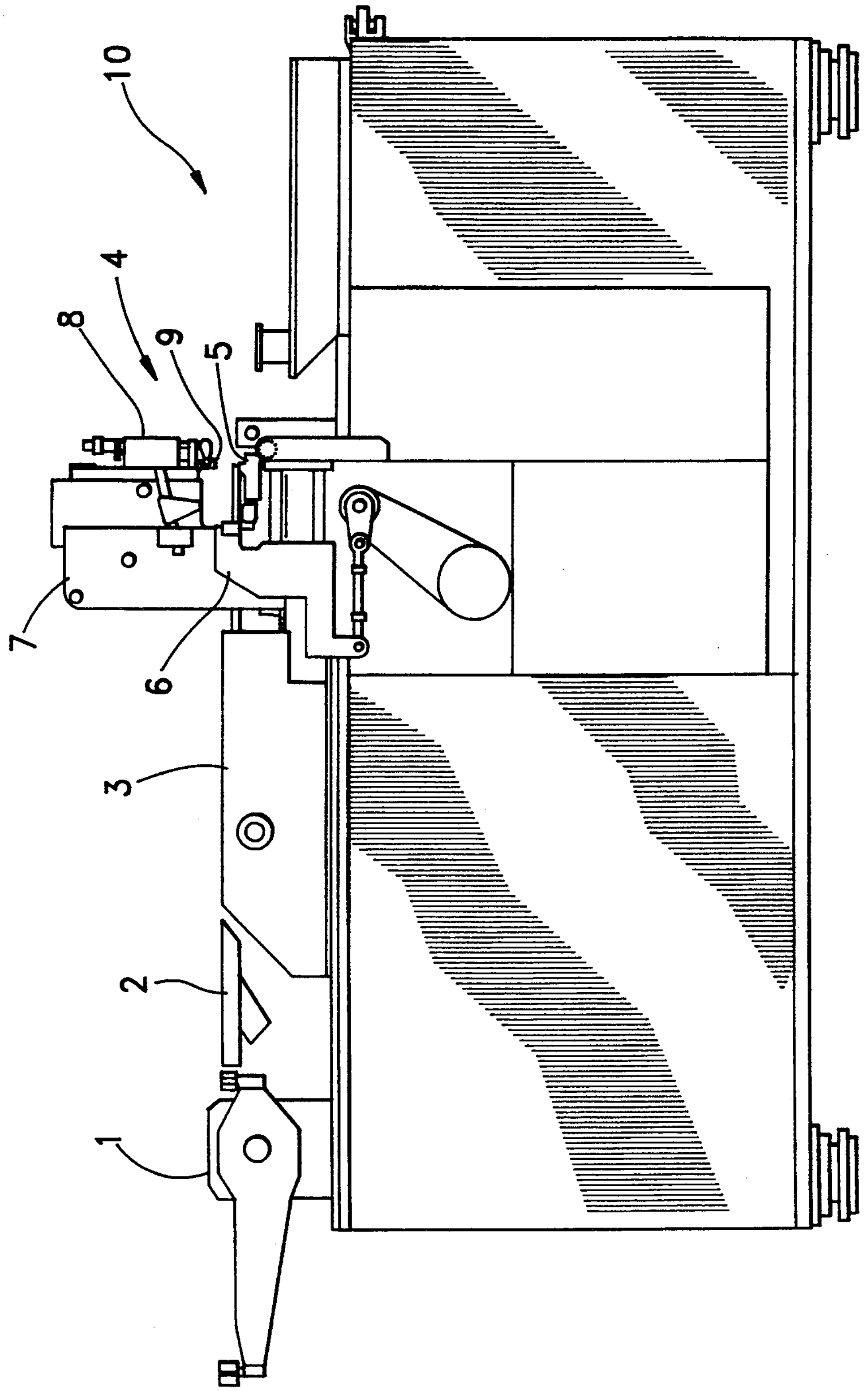
FIG. 1 is a front exterior view of the equipment for connecting wires to electrical connectors related to the first embodiment of this invention.

FIG. 1 is a front exterior view of an embodiment of the equipment used in connecting wires to electrical connectors according to this invention. A number of electrical wires are supplied to the equipment for connecting wires to electrical connectors by means of the wire dereeler 1 from the wire supply device (not shown in the Figure) located in the left part of the drawing. The electrical wires delivered by the wire dereeler 1 are transported through the wire warmer 2 in order to soften the insulation of the electrical wire supplied to the processing reels, after which they are delivered to the wire-length measuring device 3, and after their length is measured, they go to the device 4 connecting them to the connectors by means of pressure. In this pressure connecting device 4, the ends of the wires delivered therein are pulled by the wire-pull 6 in such a manner that they are placed on the top of the applicator 5.

In addition, a number of electrical connectors 11 (see FIG. 2) are supplied in this applicator 5 in a direction perpendicular to the paper surface of FIG. 1. On the top of the applicator 5, a press 7 is placed; inside this press there is a guide unit 8 moving up and down, which is intended for inserting the wires. When this wire-insertion unit 8 moves down, it guides the wire down, and at the same time, the wire-length measuring device 3 performs the measurement. After the measurement, a stuffer 9 mounted to the press 7 moves down and connects the wire to the electrical connector 11 by pressing and simultaneously cutting the other end of the wire. If necessary, a connector can be connected to the other end of the wire as well, whereby several harnesses are completed at the same time. Thereafter, the process is repeated and the next quantity of harnesses are made.

Figure 2:
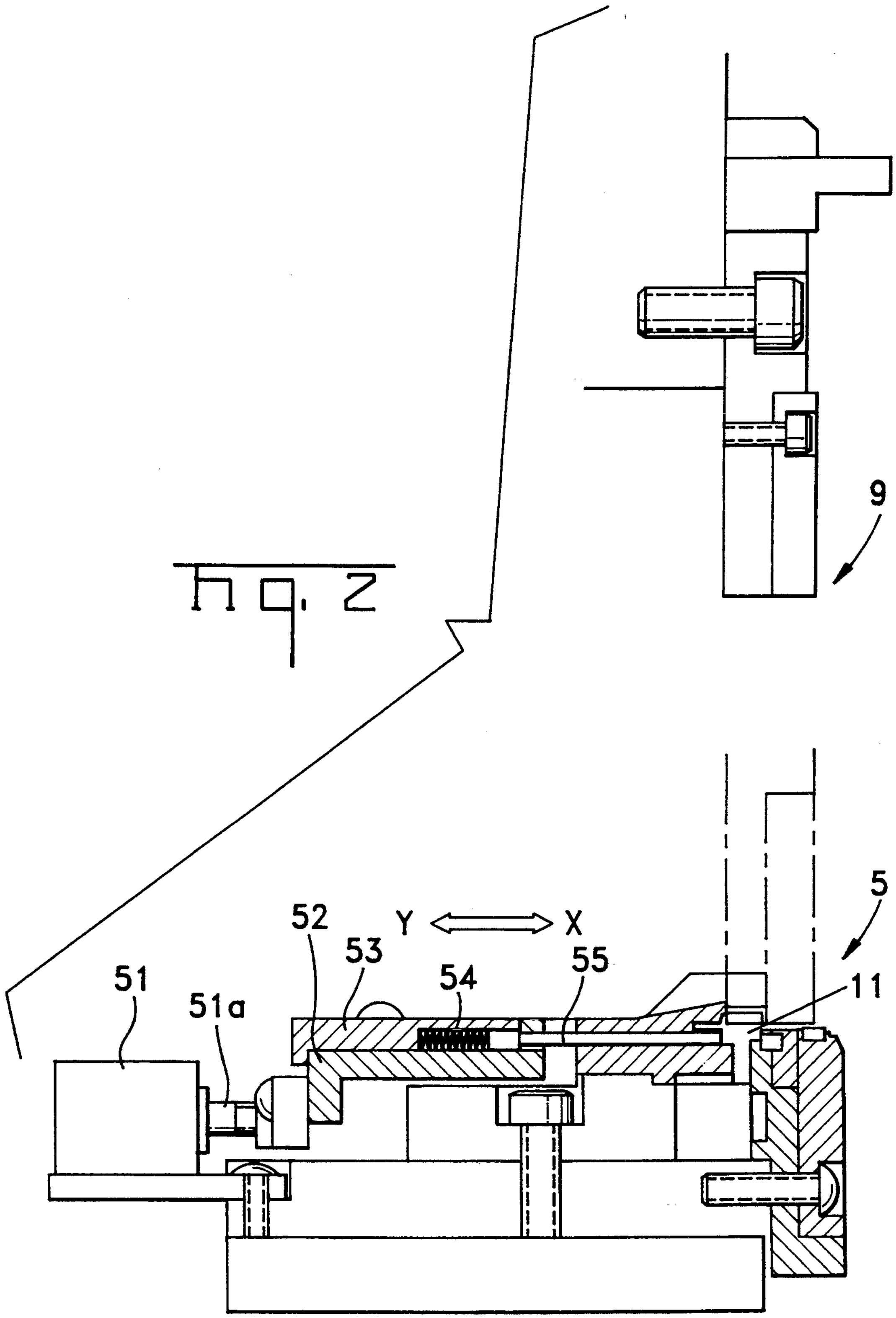
FIG. 2 is an enlarged view of the applicator and stuffer used in the equipment for connecting wires to electrical connectors shown in the FIG. 1.

FIG. 2 is a typical drawing showing applicator 5 and stuffer 9 of the pressure-connecting unit 4 of the equipment for connecting wires to electrical connectors 1 shown in FIG. 1.

The applicator 5 has a cylinder 51, a cylinder rod **51*a*, and a retaining block 52 attached to it. The retaining block 52 can move left and right (in the direction of arrows X and Y) when cylinder 51 is being operated. A position determining pin unit 53, which includes a guide plate 53*a* is attached to the retaining block 52. The position determining pin unit 53 is an example of the position-determining means mentioned in the instant invention. It consists of a position determining pin 55 and a spring 54 attached to its rear end. When a number of electrical connectors 11 are placed in the applicator 5, the cylinder 51 moves the retaining block 52 and the position determining pin unit 53 in the direction shown by arrow X. Due to this movement, the position determining pins 55, which project through a passage in guide plate 53*a*, come in contact with the electrical connectors 11, and if there is a number of electrical connectors 11 arranged in a row, the position-determining pins come in contact with every electrical connector 11. After that, the stuffer 9 moves down to the position indicated in the drawing with a dashed line, and presses the electrical wires (not shown in the drawing) into the positions connecting them to the appropriate contacts of the electrical connectors 11**.

Figure 3:
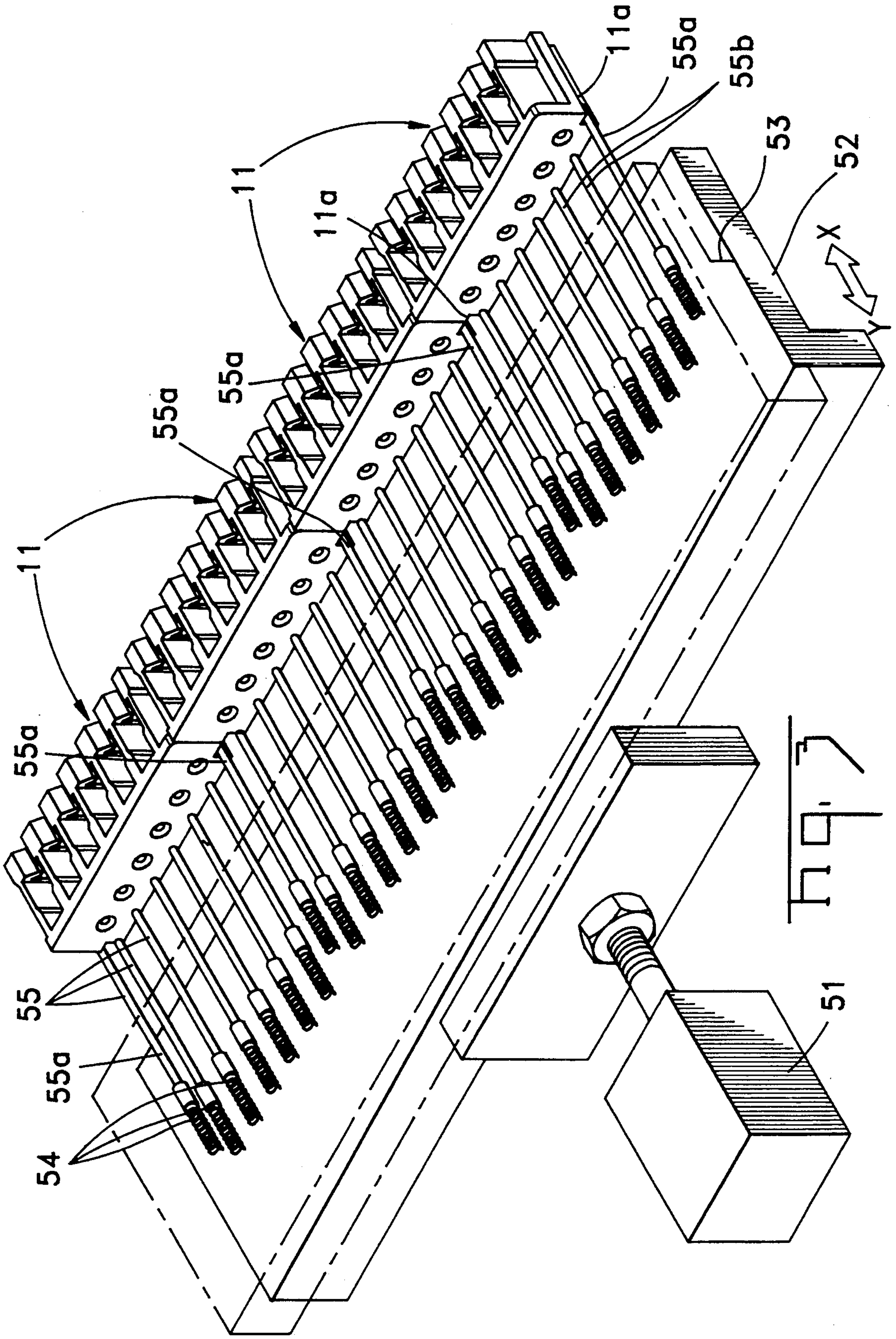
FIG. 3 is an oblique view of the position-determining mechanism used in the applicator shown in FIGS. 1 and 2.

FIG. 3 is an oblique view of the position-determining mechanism mounted to the applicator 5 shown in FIGS. 1 and 2. As shown in FIG. 3, the position-determining pin unit 53 has a number of the position-determining pins 55, and when the cylinder 51 moves the retaining block 52 in the direction shown with the arrow X, the position-determining pins **55*a* determine the position of the electrical connectors 11 arranged in a row (in this case, there are 4 connectors,) by sliding into the grooves 11*a* provided at the lower part of both ends of the electrical connectors 11. Due to this circumstance, the position of each individual electrical connector 11 is determined regardless of the position of the adjacent connector, thus eliminating the cumulative effect of the errors in the external dimensions. This makes it possible to allow reasonable tolerances in the dimensions of the housings of the electrical connectors 11**, resulting in an easier manufacturing process of the individual assembled connectors and in an increase in the number of harnesses which can be made simultaneously.

At this point, the position-determining pins **55*b*, (other than the position-determining pins 55*a* whose end slid into the grooves 11*a* of the electrical connectors 11,) come into contact with the surface of the housing of the electrical connectors 11, and their springs 55 become compressed. These position-determining pins 55*b* do not contribute to the determination of the position of the electrical connectors 11. Rather, they are provided because this equipment for connecting wires to electrical connectors is universally designed for handling various types of electrical connectors. In this specific case we discuss six-contact electrical connectors 11, but it is also possible to handle electrical connectors having other numbers of contacts, and the position-determining pins 55** are used for determining the positions of various types of electrical connectors.

Figure 4:
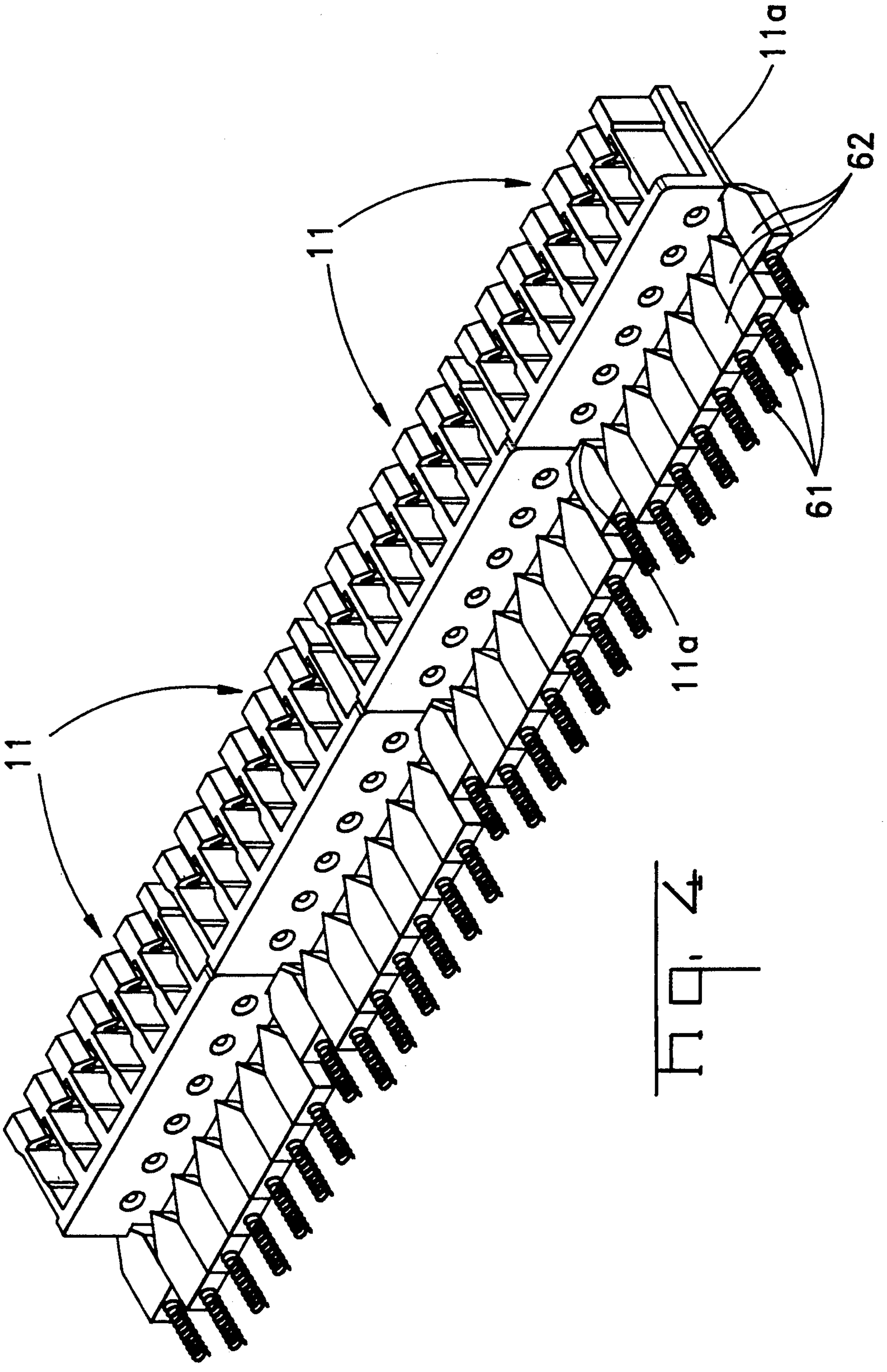
FIG. 4 is an oblique view of the specific detail of the second embodiment of this invention.

FIG. 4 represents an oblique view of the specific detail of another embodiment of this invention. In this embodiment, instead of the position-determining pins 55 (see FIG. 3) used in the first embodiment, the position-determining pieces 62 actuated by springs 61 attached to their back ends are used. Since the front ends of these position-determining pieces are made in the shape of wedges, the accuracy of positioning an individual electrical connector in the row of electrical connectors loaded in the applicator using these position-determining pieces 62 is very high even if the general error in the connector positioning is rather large.

Figure 5:
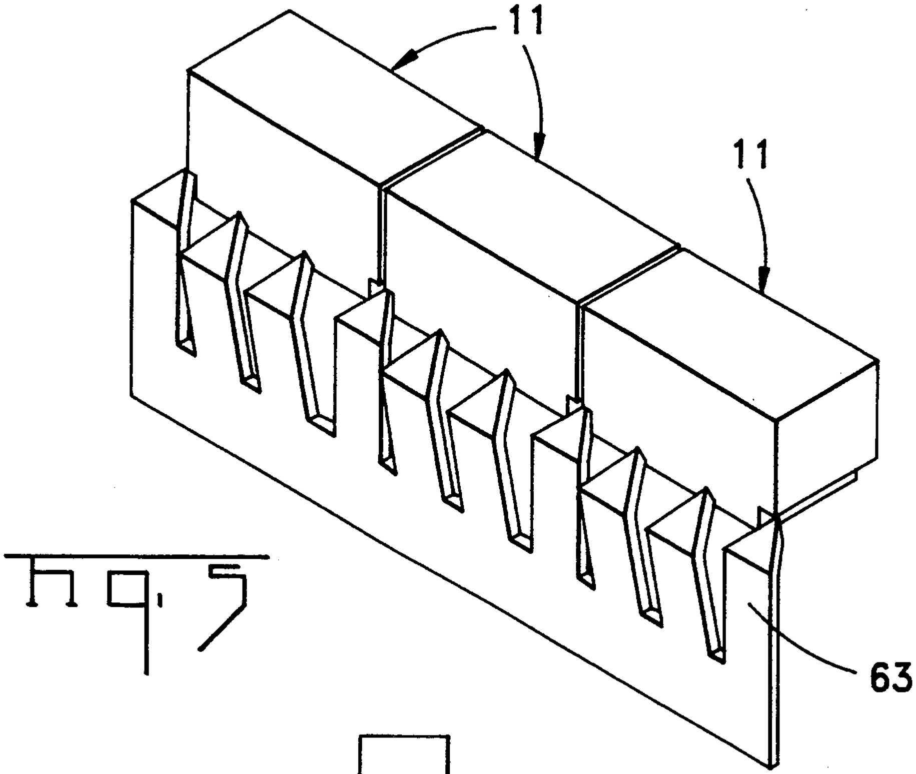
FIG. 5 is an oblique view of the specific detail of the third embodiment of this invention.

FIG. 5 represents an oblique view of a specific detail of the third embodiment of this invention. In this embodiment, instead of position-determining pins or pieces used in the embodiments described previously, a plate cut-out and bent to acquire a certain shape is used as a position-determining part 63. The advantage of this embodiment is low cost of manufacture.

FIG. 6 represents an oblique view of the specific detail of the fourth embodiment of this invention. In this embodiment, the position-determining device 64 is set up at the housing of the electrical connector and has the position-determining pins 65 corresponding to the pin-shaped contacts (not shown in the drawing) of the matching half of the connector being processed, which fit into the holes 11b for such contacts. Springs 66 are attached to the back ends of each position-determining pin 65; they are designed in such a manner as to be compressed when the pins are inserted into the holes and act to pull out the pin from the holes. This position-determining device 64 is attached to the rod 67a of the power or hydraulic cylinder 67, and when the cylinder is operated, the position-determining device 64 moves in the direction shown by the arrow X, and the position-determining pins 65 slide into the holes 11b of the housing, thus determining the position of the electrical connector 11 independently from the adjacent electrical connectors (not shown in the drawing).

FIG. 7 represents an oblique view of the specific detail of the fifth embodiment of this invention. In this embodiment, the position of the electrical connectors is determined by means of the ball plungers 68 which slide into the grooves 11c provided for this purpose in the bottom surface of the housing of the electrical connector 11.

Figure 8:
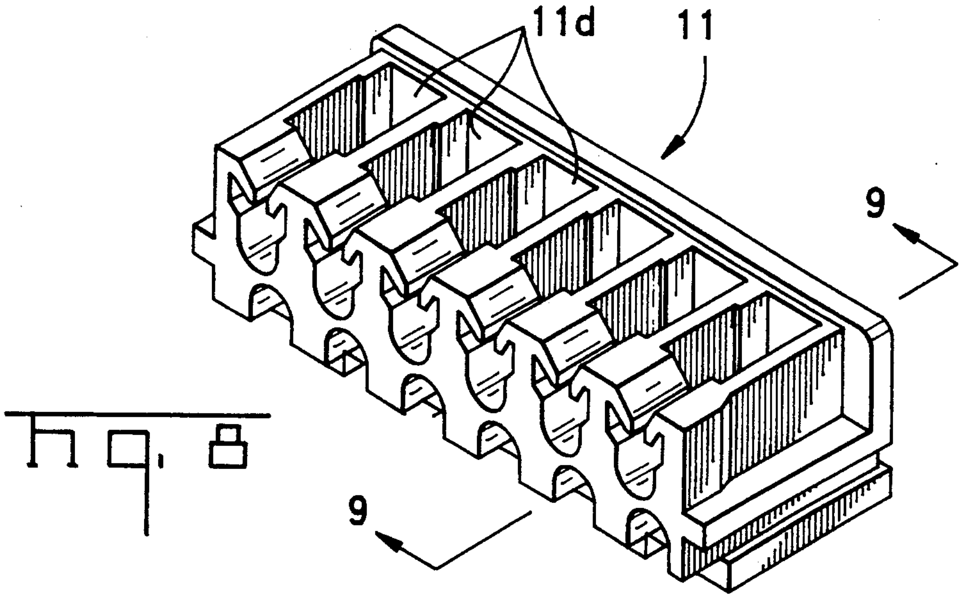
FIG. 8 is a drawing of the specific detail of the sixth embodiment of the invention.
Figure 9:
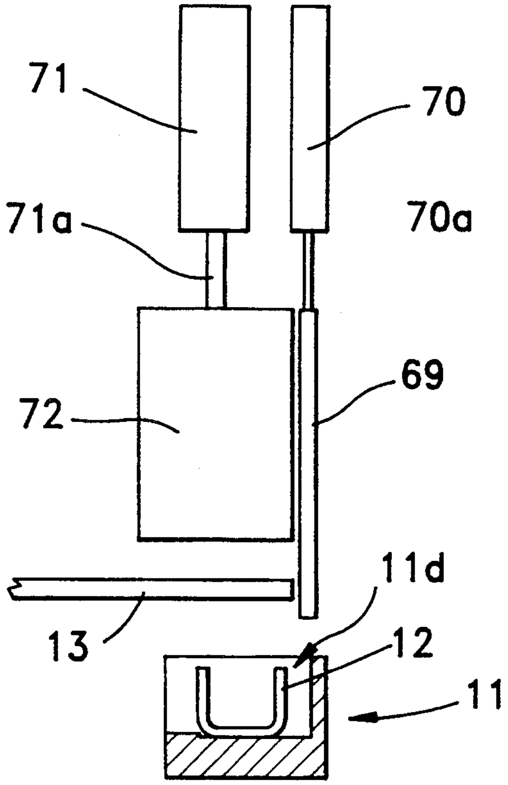
FIG. 9 is a side elevational view showing the instant invention prior to a wire being assembled to the connector.
Figure 10:
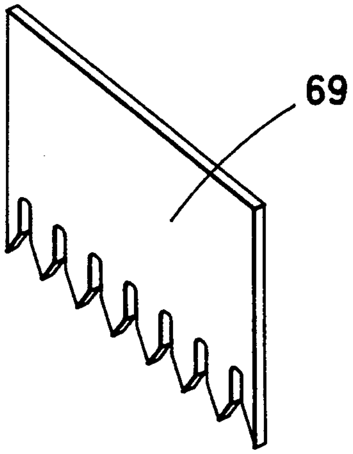
FIG. 10 is a perspective view of the comb used in FIG. 9.

FIGS. 8–10 represent the specific detail of the sixth embodiment of this invention. In the lower part of FIG. 9, there is shown a cross-section along A—A of the electrical connector 11 shown in FIG. 8. This electrical connector 11 has contacts 12 designed for attaching wires by pressure, and above the electrical connector 11 there are the cylinder 70 and cylinder rod 70a to the free end of which a position-determining part in the form of the comb-shaped plate 69 shown in FIG. 10 is attached. Next to this position-determining part 69 there is a cylinder 71 with a cylinder rod 71a to the free end of which a stuffer 72 is attached. When the cylinder 71 is actuated, the stuffer 72 moves up and down, thus attaching the electrical wires 13 to the contacts 12. Before or almost simultaneously with the down stroke of the cylinder 71, the cylinder 70 is also actuated resulting in a downward movement of the position-determining part 69 whose comb-shaped end becomes engaged with the openings 11d provided for this purpose in the upper part of the housing of the electrical connector 11, thus securing the electrical connector 11 in the required position.

Figure 11:
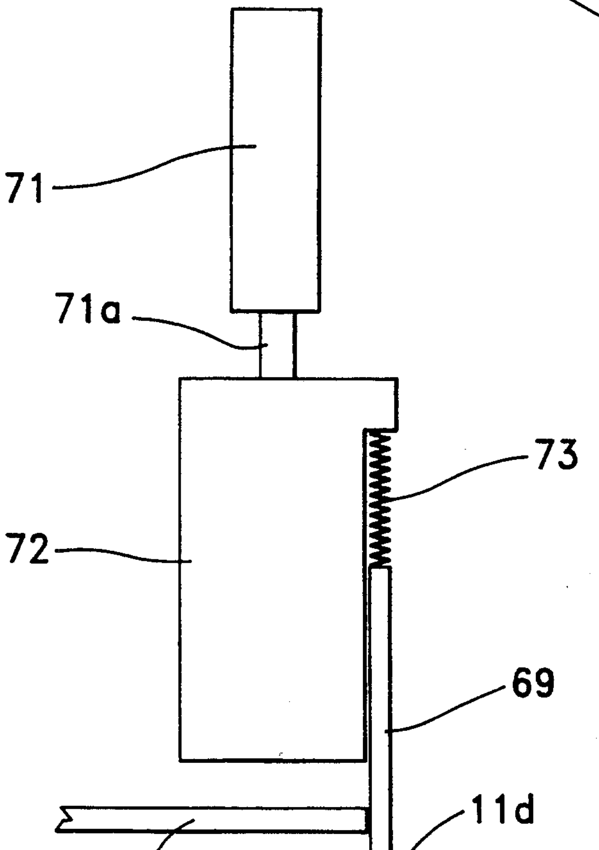
FIG. 11 is a drawing of the specific detail of the seventh embodiment of this invention.

FIG. 11 represents a drawing of the specific detail of the eighth embodiment of this invention. It is similar to the sixth embodiment, and we will explain only the differences using the same numbers for identification of similar parts. The position-determining part 69 is attached to the stuffer 72 by means of the spring 73 so that its bottom edge is positioned lower than the bottom edge of the stuffer 72. When the stuffer 72 moves downward under the action of the cylinder 71, first the position of the electrical connector 11 is determined by the position-determining part 69, and then the wire 13 is attached by pressure to the contact 12.

Figure 12:
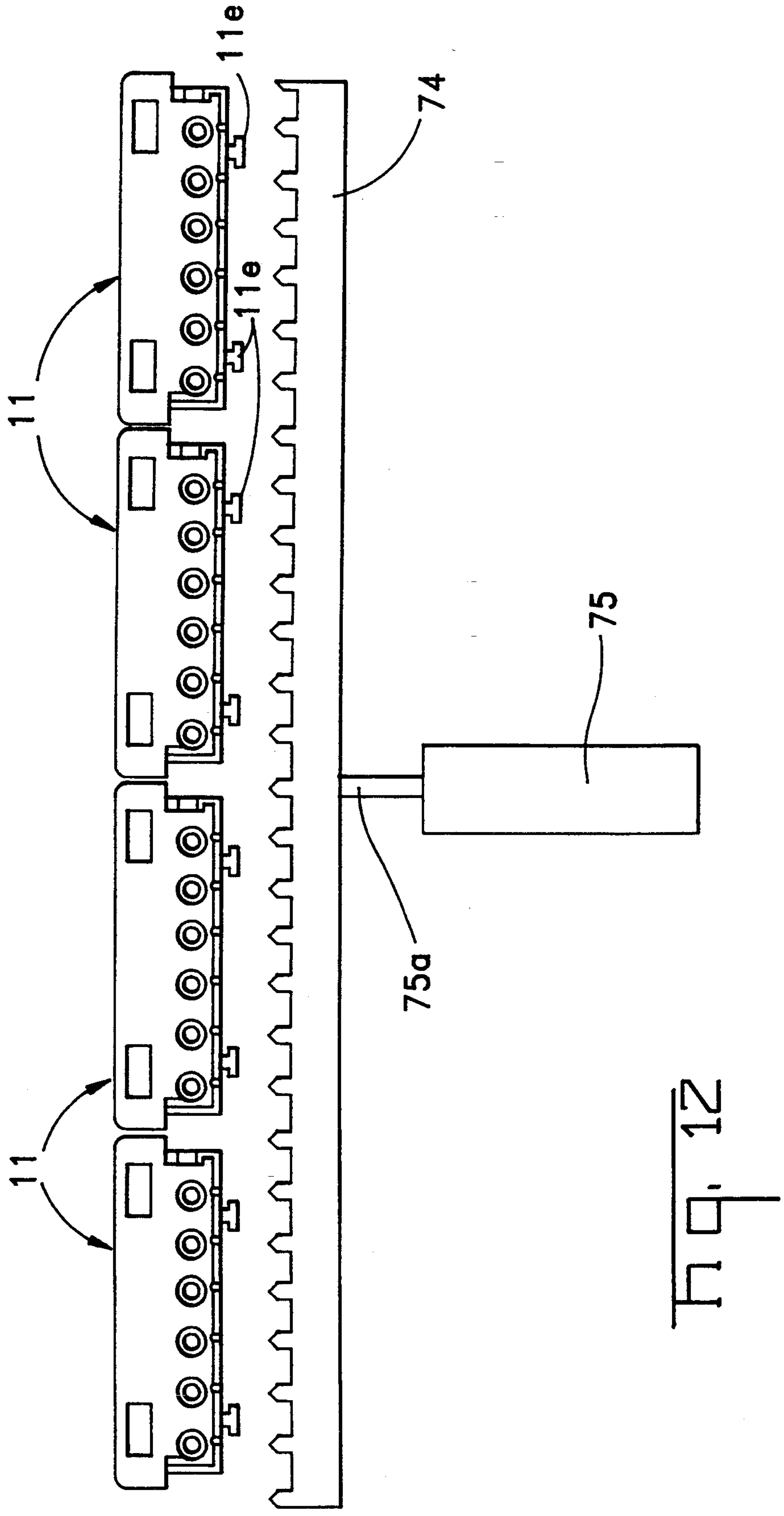
FIG. 12 is a drawing of the specific detail of the eighth embodiment of this invention.

FIG. 12 represents a drawing of the specific detail of the eighth embodiment of this invention. In this embodiment, the position of the electrical connectors 11 is determined by using the depressions 11e provided in the connector housings. A comb-shaped position-determining part 74 such as is shown in the drawing is attached to the rod 75a of the cylinder 75. When the cylinder 75 is actuated, the position-determining part 74 moves upward and the ends of the comb teeth enter the depressions 11e provided at the bottom surface of the electrical connector 11, thus securing the electrical connectors in the position required for connecting the wires to the contacts.

Figure 13:
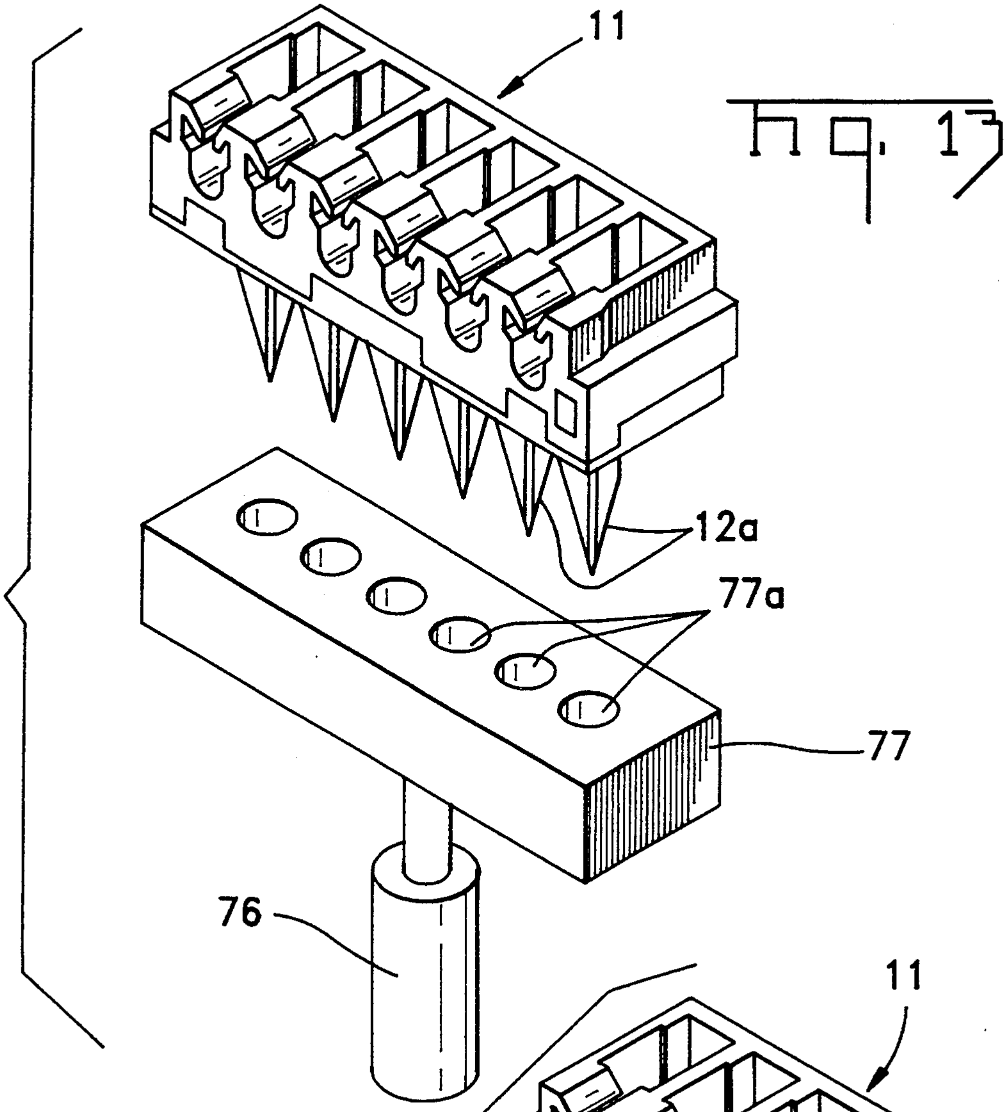
FIG. 13 is a drawing of the specific detail of the ninth embodiment of this invention.

FIG. 13 represents a drawing of the specific detail of the ninth embodiment of this invention. Contact tie-ins 12a of the electrical connector 11 protrude through the bottom surface of the housing. In the position-determining part 77 of this embodiment the round holes 77a are provided at the same pitch as the pitch of the contact tie-ins 12a. When the cylinder 76 is actuated, the position-determining part 77 moves upward, and the tie-ins 12a enter round holes 77a, thus securing the position of the electrical connector.

Figure 14:
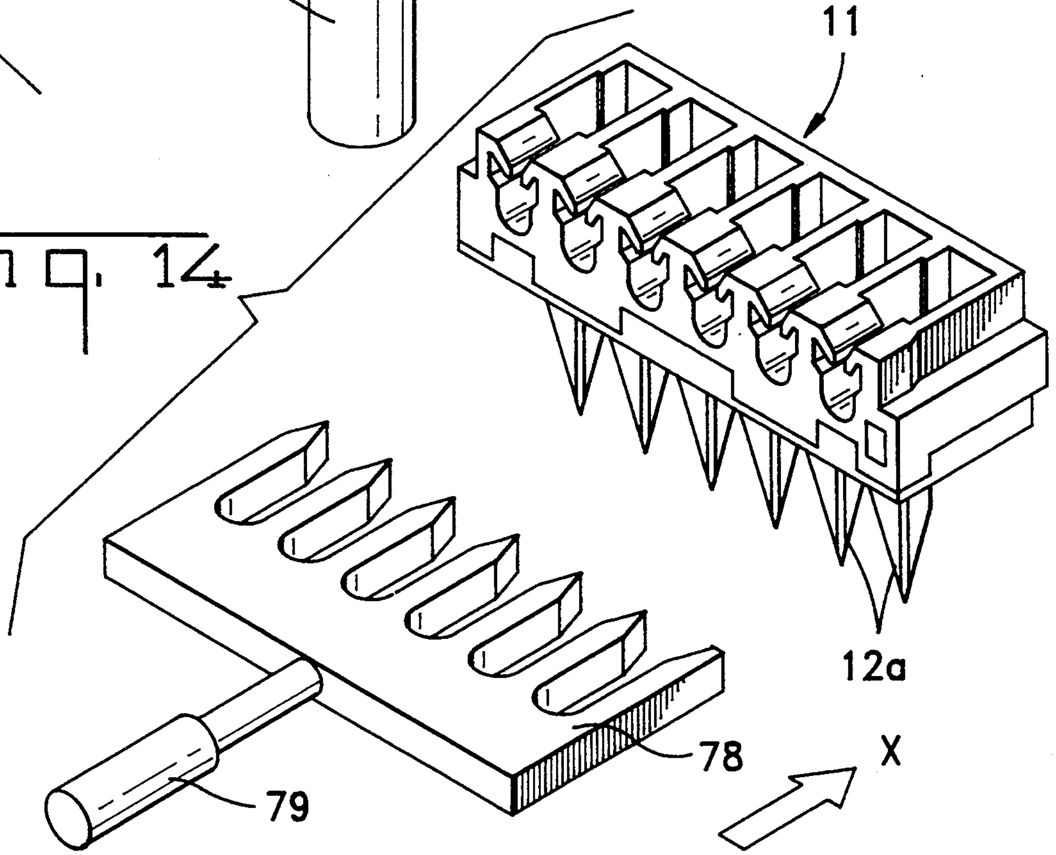
FIG. 14 is a drawing of the specific detail of the tenth embodiment of this invention.

FIG. 14 represents a drawing of the specific detail of the tenth embodiment of the instant invention. The position-determining part 78 of this embodiment is made in the form of a comb which becomes engaged with the tie-ins 12a. When the cylinder 79 is actuated, the position-determining part 78 moves in the direction of arrow X and becomes engaged with the tie-ins 12a, thus securing the position of the electrical connector 11.

As has been shown in the examples of several embodiments of this invention, there may be a number of designs for the position-determining device and a number of methods for the engagement of the position-determining device when used with the electrical connector whose position should be determined. In addition, it is clear that the instant invention is not limited to automatic equipment for connecting wires to electrical connectors only, but to the manually operated devices as well.

It follows from the above explanations that the equipment for connecting wires to electrical connectors according the instant invention makes it possible to avoid the cumulative effect of the errors in the external dimensions of individual electrical connectors due to the fact that a position-determining device is provided for each connector of the batch being processed. Therefore, it is possible to attach wires to electrical connectors with rather large errors in their external dimensions, thus substantially simplifying the process of their manufacture, and enabling it to simultaneously process a larger number of connectors, which results in an increased productivity of the harness manufacturing process.

We claim:

1. A position-determining apparatus for use with a wire termination machine and at least one electrical connector housing, wherein the connector housing has electrical terminals therein and surfaces for engaging the position-determining apparatus, said apparatus comprising:

a power means connected to a frame of said machine, the power means being operatively connected to a reciprocating rod, said rod being connected to a retaining block, said retaining block being supported by said frame for reciprocating motion thereon to and from advanced and retracted positions;

said retaining block supports a position-determining means for aligning said at least one connector housing during the wire termination process, wherein the position-determining means aligns said connector for disposition of wires in said connector by a wire stuffer during the wire termination process; and wherein said position-determining means comprises a plurality of pins positioned for contact with said housing, each of said pins having biasing means connected thereto for allowing independent movement of said pins relative to each other as said pins contact said housing.

2. The apparatus of claim 1, wherein the position-determining means further comprises a plate and the pins are located in a recess between the retaining block and said plate for reciprocating motion therein.

3. The apparatus of claim 1, wherein the biasing means comprises a spring disposed in a recess of said position-determining means.

4. The apparatus of claim 1, wherein the position determining means further comprises a first plate member with a recess therein for accommodating said biasing means, and a second plate for guiding the pins toward said connector during the wire termination process.

5. The apparatus of claim 1, wherein the position determining means comprises a plate having a recess therein, a guide plate having a passage therein whereby said pins pass through and can reciprocate in said passage; and wherein said guide plate, said retaining block, and said plate recess form a cavity.

6. The apparatus of claim 5, wherein said biasing means is disposed in said cavity and is compressed when said position-determining means is in said advanced position as said pins engage said connector housing during the wire termination process.

7. The apparatus of claim 5, wherein said biasing means is disposed in said cavity for biasing the pins against the guide plate when said position-determining apparatus is in the retracted position.

8. The apparatus of claim 1, wherein each pin has an end for registering with the connector during said wire termination process, some of said ends being at a further extension than other of said ends when said position determining means is in said advanced position.

9. The apparatus of claim 8, wherein said extended ends are extended for disposition in a recess formed in said connector housing thereby assisting in alignment of said housing during said wire termination process.

10. A position-determining apparatus for use with a wire termination machine and at least one electrical connector housing, wherein the connector housing has electrical terminals therein and surfaces for engaging the position-determining apparatus, said apparatus comprising:

a power means connected to a frame of said machine, the power means being operatively connected to a reciprocating rod, said rod being connected to a retaining block, said retaining block being supported by said frame for reciprocating motion thereon to and from advanced and retracted positions;

said retaining block supports a position-determining means for aligning said at least one connector housing during the wire termination process, wherein the position-determining means aligns said connector for disposition of wires in said connector by a wire stuffer during the wire termination process; and wherein said position-determining means comprises a plurality of rigid pins positioned for contact with said housing, each of said pins having biasing means connected thereto for allowing independent movement of said pins relative to each other as said pins contact said housing.

11. The position-determining apparatus of claim 10, wherein the pins have a circular cross-section.

12. The position-determining apparatus of claim 10, wherein the pins are essentially rigid, non-cantilever type rods.

13. The positioning-determining apparatus of claim 10, wherein the pins are disposed in generally the same plane across the position-determining apparatus.

14. The position-determining apparatus of claim 10, wherein the pins are generally the same thickness along their ends.

* * * * *